United States Patent
Yae et al.

(10) Patent No.: US 7,357,417 B2
(45) Date of Patent: Apr. 15, 2008

(54) SHOCK-ABSORPTION STEERING APPARATUS

(75) Inventors: Hitoshi Yae, Obu (JP); Morito Oshita, Kariya (JP); Hidetoshi Inayoshi, Aichi-ken (JP); Hideyasu Miyata, Toyoake (JP)

(73) Assignee: Aisen Seiki Kabushiki Kaisha, Kariya-Shi, Aichi-Ken (JP)

( * ) Notice: Subject to any disclaimer, the term of this patent is extended or adjusted under 35 U.S.C. 154(b) by 288 days.

(21) Appl. No.: 11/167,204

(22) Filed: Jun. 28, 2005

(65) Prior Publication Data

US 2005/0285383 A1    Dec. 29, 2005

(30) Foreign Application Priority Data

Jun. 28, 2004  (JP) ............................. 2004-190400
May 31, 2005  (JP) ............................. 2005-160626

(51) Int. Cl.
*B60D 1/11*    (2006.01)
(52) U.S. Cl. ..................................... 280/777
(58) Field of Classification Search ................ 280/777, 280/775; 74/492
See application file for complete search history.

(56) References Cited

U.S. PATENT DOCUMENTS 4,901,592 A * 2/1990 Ito et al. ....................... 74/492
5,562,307 A * 10/1996 Connor ......................... 280/777
6,454,302 B1 * 9/2002 Li et al. ........................ 280/777
6,631,924 B2  10/2003 Nomura et al.
6,764,098 B2 * 7/2004 Matsumoto et al. ......... 280/777
6,802,536 B2  10/2004 Li et al.
2004/0245760 A1 * 12/2004 Kondoh et al. .............. 280/777

FOREIGN PATENT DOCUMENTS

| DE | 103 13 470 B3 | 9/2004 |
|----|---|---|
| JP | 2002-362381 | 12/2002 |
| WO | 00/76833 A1 | 12/2000 |

* cited by examiner

*Primary Examiner*—Paul N. Dickson
*Assistant Examiner*—Robert A. Coker
(74) *Attorney, Agent, or Firm*—Buchanan Ingersoll & Rooney PC (57) ABSTRACT

A shock-absorption steering apparatus is provided which is capable of absorbing impact with a simple structure independently on a driving condition. A support pin for controlling the squeezing load to an energy absorption plate corresponding to its rotation is provided with a retainer. A slider is also provided, which can or cannot abut the retainer by moving up and down along with the drive of a motor. When the body weight of a driver is a reference weight or more, the rotation of the support pin is restricted by driving the motor so as to allow the slider to abut the retainer. When the body weight is less than the reference weight, the support pin is enabled to rotate by driving the motor so as to separate the slider from the retainer.

16 Claims, 11 Drawing Sheets

SHOCK-ABSORPTION STEERING APPARATUS

This application is based on and claims priority under 35 U.S.C. § 119 to Japanese Patent Application 2004-190400, filed on Jun. 28, 2004 and Japanese Patent Application 2005-160626, filed on May 31, 2005, the entire content of which is incorporated herein by reference.

BACKGROUND OF THE INVENTION

1. Field of the Invention

The present invention relates to a shock-absorption steering apparatus.

2. Description of the Related Art

There have been provided shock-absorption steering apparatuses which absorb impact energy generated by a collision of a driver to a steering wheel due to collision inertia when a vehicle is collided with another vehicle or a building.

In such a shock-absorption steering apparatus, a steering column is generally supported to a vehicle body movably forward the vehicle body by an impact while collision energy is absorbed by limiting the displacement of the steering column during the movement.

However, if a driving condition, such as the driver, is changed, the load applied to the steering column is varied because of the difference in the driver's weight, for example, so that the impact energy may not be sufficiently absorbed. Hence, a shock-absorption steering apparatus that can control the amount of absorption according to the driving condition is proposed (Japanese Unexamined Patent Application Publication No. 2002-362381, FIG. 4). In this apparatus, the amount of energy absorption is adjustable by changing the rotational angle of a support pin so as to control the deformation of an energy absorption plate.

In the steering apparatus disclosed in the above publication, the rotational angle of the support pin is adjusted by a motor which, however, must have a large torque so as to overcome the reaction force generated when the energy absorption plate is deformed. Thus, the motor is increased in size and price. Furthermore, a mechanism for restricting the rotational angle of the support pin is additionally needed, resulting in the larger steering apparatus in size.

SUMMARY OF THE INVENTION

The present invention has been made in view of the problems mentioned above, and it is an object of the present invention to provide a shock-absorption steering apparatus capable of absorbing impact with a simple structure independently on a driving condition.

According to the present invention, a shock-absorption steering apparatus includes a steering column; a support member for supporting the steering column detachably from a vehicle body; and an energy absorption device for supporting the steering column relatively movably frontward the vehicle body as well as absorbing impact energy applied to the steering column by restricting the movement of the steering column during the moving, and the energy absorption device includes an energy absorption plate with one end fixed to the vehicle body; a support pin supported to the steering column so that the squeezing position of the energy absorption plate is varied by the rotation, and the squeezing load to the energy absorption plate when the energy absorption plate is squeezed toward the other end is varied with the squeezing position; a retainer fixed to the support pin for rotating the support pin along with the rotation of the retainer; restricting means arranged detachably from the retainer for rotating or not rotating the retainer; and a motor for controlling the retainer to rotate or not rotate via the restricting means corresponding to a driving condition.

Preferably, the support pin is a crank-like pin having a first crank and a second crank, and the first crank squeezes the energy absorption plate while the second crank is provided with the retainer, and wherein by rotating the second crank, the squeezing position is varied.

Preferably, the restricting means is a slider that reciprocates so as to be arranged at an engagement position with the retainer or at a non-engagement position therewith corresponding to normal and reverse rotations of the motor.

Preferably, the driving condition is a body weight of a driver of the vehicle, and the energy absorption device includes a sensor arranged in a driver's seat equipped in the vehicle body for detecting the body weight of the driver and a control circuit storing a reference weight established in advance so as to compare the reference weight with the weight detected by the sensor for controlling the motor based on the compared result.

Preferably, the steering column includes at least one of a tilt mechanism and a telescopic mechanism.

Preferably, the vehicle body includes detecting means arranged for detecting the driving condition, and the motor is controlled based on the result detected by the detecting means.

(Operation)

According to the present invention, when the restricting means abuts the retainer, the rotation of the support pin is restricted, and to the support pin, the energy absorption plate is supported at the rotational position at this time. The motor drives the restricting means when the support pin is located at a desired rotational position. Hence, the motor does not restrict the rotation itself of the support pin, so that the required torque can be reduced, resulting in a small-sized motor. The motor itself may be inexpensive because of the small torque, so that the steering apparatus capable of controlling the energy absorption amount corresponding to the driving condition can be reduced in cost.

According to the present invention, the structure of the support pin may be simplified.

According to the present invention, the structure of the restricting means may be simplified.

According to the present invention, since the position of the support pin is controlled corresponding to the weight of the driver, the absorption amount of the collision energy of the energy absorption plate may be controlled corresponding to the weight of the driver.

According to the present invention, in the shock-absorption steering apparatus having at least one of the tilt mechanism C1 and the telescopic mechanism C2, the motor for controlling the position of the support pin may be miniaturized. Accordingly, the steering apparatus capable of controlling the energy absorption amount corresponding to the driving condition can be reduced in cost.

According to the present invention, the motor controls the restricting means based on the value detected by the detecting means. Therefore, the rotational position of the support pin may be controlled based on the value detected by the detecting means.

DESCRIPTION OF THE PREFERRED EMBODIMENTS

First Embodiment

A first embodiment of the present invention will be described below with reference to FIGS. 1 to 11.

Figure 1:
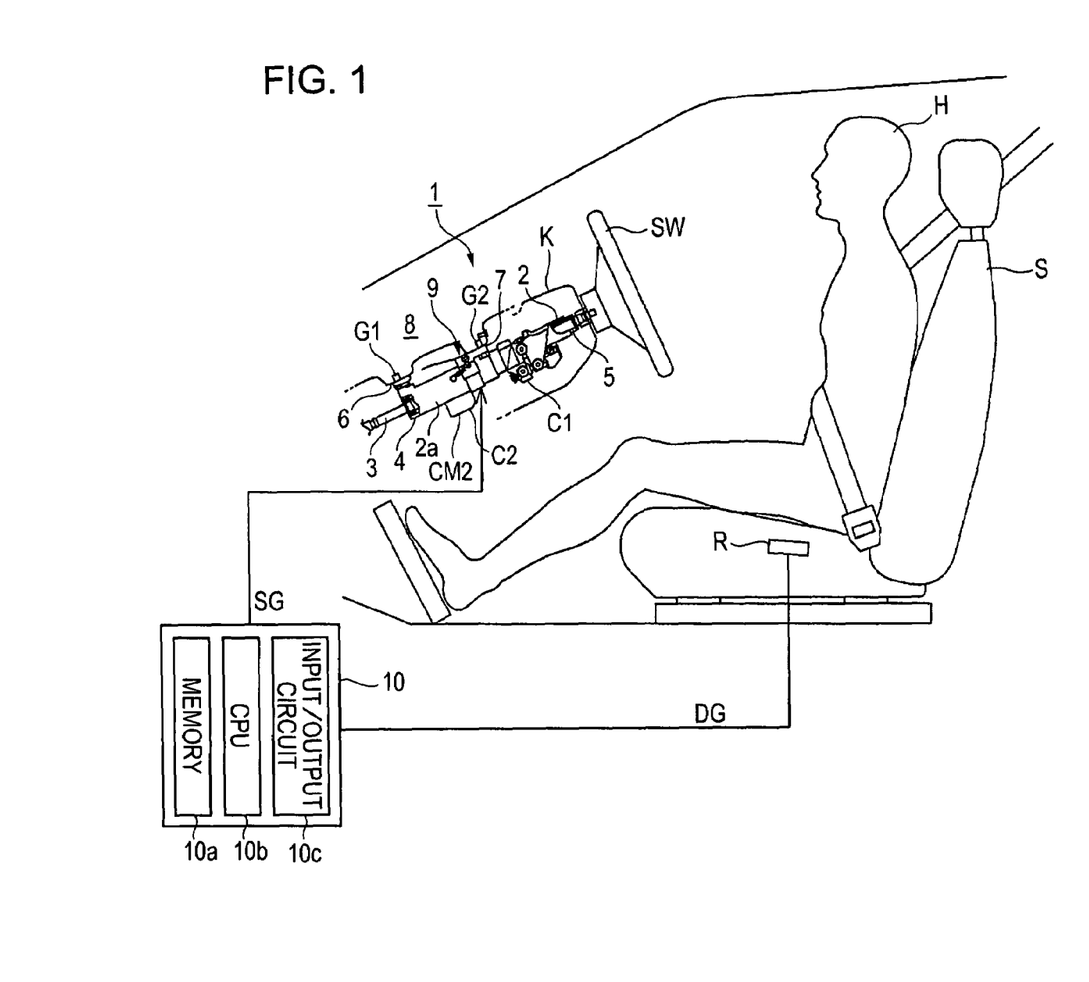
FIG. 1 is a side view of a shock-absorption steering apparatus according to a first embodiment of the present invention showing its portion inside a vehicle cabin.

FIG. 1 is a side view of an essential part of a shock-absorption steering apparatus 1 (simply referred to as a steering apparatus 1 below) according to the first embodiment of the present invention.

As shown in FIG. 1, the steering apparatus 1 includes a steering column device 2 and a steering shaft 3 inserted through the steering column device 2.

The steering column device 2 is accommodated within a column cover K, and journals the steering shaft 3 with bearings 4 and 5. To the steering shaft 3, a steering mechanism (not shown) is connected on the front side of a vehicle body and a steering wheel SW is attached on the rear side of the vehicle body.

The steering column device 2, having a column housing 2a, is supported to the vehicle body 8 at a pair of front and rear first and second support members 6 and 7, which are arranged in the column housing 2a, through bolts G1 and G2, respectively. The respective first and second support members 6 and 7 have a function to break away the entire steering column device 2 off the vehicle body 8 when a predetermined load is applied along the longitudinal direction of the steering shaft 3 toward the vehicle body front.

The column housing 2a is provided with an energy absorption device 9 having a function to absorb the impact received by a driver H from the steering wheel SW by limiting the forward movement of the steering column device 2 when the steering column device 2 is separated toward the vehicle body front.

The steering apparatus 1 is provided with a sensor R built therein for detecting a weight of the driver H. A detection signal DG outputted from the sensor R is produced in a controller 10 equipped within the vehicle body 8 via wiring (not shown).

The controller 10 is provided with a memory 10a, a CPU 10b, and an input/output circuit 10c, which are built therein. The memory 10a is provided with a reference body weight stored therein and established in advance. The detection signal DG enters the controller 10 via the input/output circuit 10c.

The CPU 10b detects the weight of the driver H with the detection signal DG so as to determine whether the weight exceeds the reference body weight or not. The CPU 10b feeds a control signal SG corresponding to the determination result to the steering column device 2 via the input/output circuit 10c. According to the embodiment, the CPU 10b produces the H-level control signal SG when the weight of the driver H is the reference body weight or more while producing the L-level control signal SG when the weight is less than the reference body weight. Specifically, according to the embodiment, when the CPU 10b determines the weight of the driver H to be 80 kg or more, the H-level control signal SG is fed to the steering column device 2, while when determining the weight less than 80 kg, the L-level control signal SG is fed to the steering column device 2.

Figure 3:
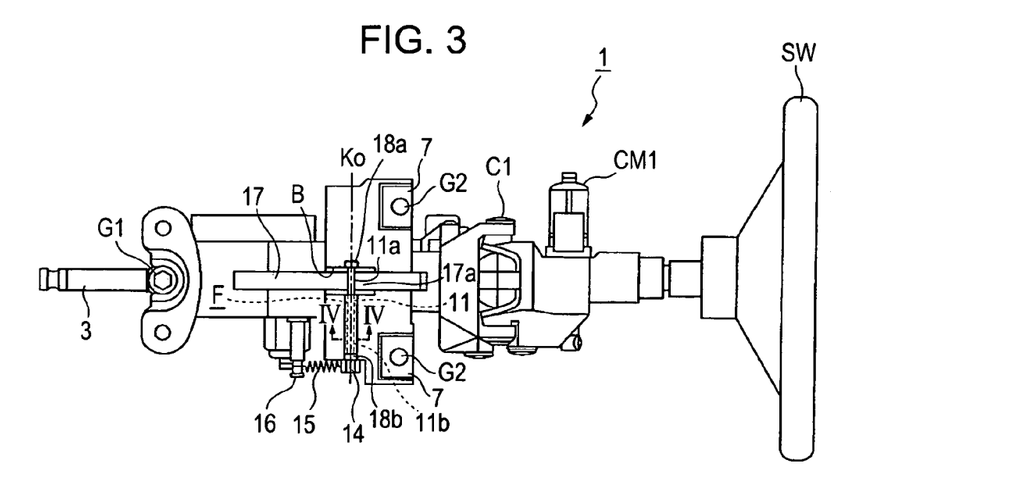
FIG. 3 is a plan view of the same steering apparatus.

The steering apparatus 1 is provided with a tilt mechanism C1, and the tilt angle of the steering apparatus 1 is controlled by driving a tilt control motor CM1 (see FIG. 3). The steering apparatus 1 is also provided with a telescopic mechanism C2, and the telescopic amount of the steering apparatus 1 is controlled by driving a telescopic control motor CM2.

Next, the energy absorption device 9 will be described in detail with reference to FIGS. 2 to 7.

Figure 2:
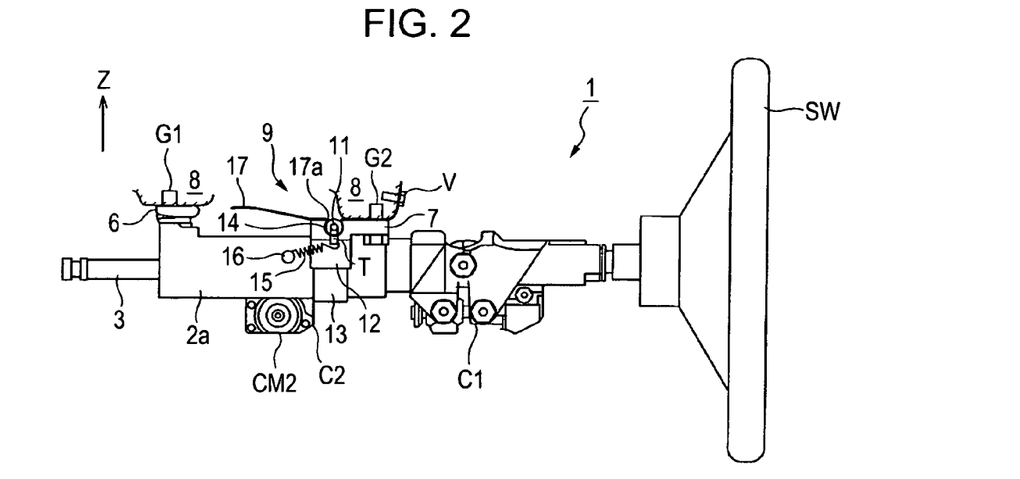
FIG. 2 is a side view of the steering apparatus.

FIG. 2 is a side view of the steering apparatus 1 according to the embodiment; and FIG. 3 is a plan view of the steering apparatus 1.

As shown in FIGS. 2 and 3, the energy absorption device 9 is arranged in the column housing 2a, and includes a support pin 11, restricting means 12, a motor 13, a spring holder 14, a spring 15, a spring pin 16, and an energy absorption plate 17.

Figure 4:
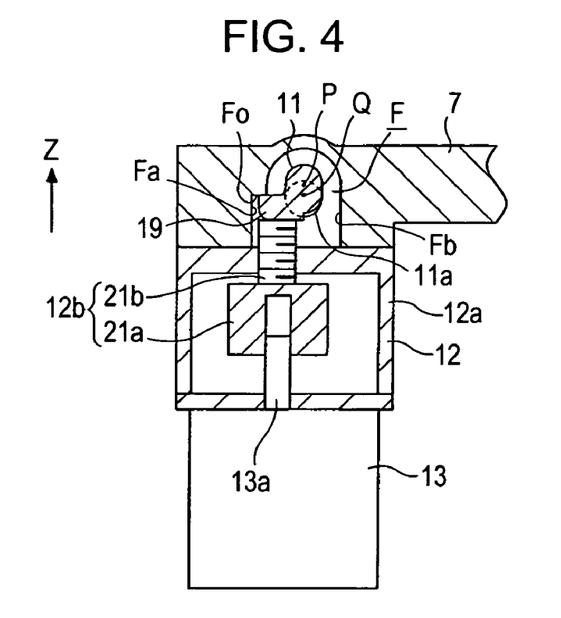
FIG. 4 is a sectional view at the line A-A of FIG. 3 for illustrating an energy absorption device.

As shown in FIG. 3, the column housing 2a is provided with a pair of first and second bearings 18a and 18b formed on a line Ko perpendicular to the longitudinal direction of the steering shaft 3 and a recess B formed on the line Ko. Furthermore, as shown in FIG. 4, the column housing 2a is provided with a hollow space F formed between a side face forming the recess B and the second bearing 18b and along the line Ko.

The crank-like support pin 11 arranged in the recess B and the space F is rotatably supported to the first bearing 18 at one end and to the second bearing 18b at the other end. The crank-like support pin 11, as shown in FIG. 3, is composed of a first crank 11a arranged adjacent to the first bearing 18a so as to be exposed from the recess B and a second crank 11b arranged adjacent to the second bearing 18b so as to be positioned within the space F. Thus, the axis Q of the first crank 11a is deviated from the axis P of the second crank 11b by a distance I (see FIG. 5).

As shown in FIG. 2, an end of the second crank 11b extrudes from the second bearing 18b, and the spring holder 14 is fixed to the extruded portion. The spring holder 14 is provided with a claw T extruding in counter arrow Z direction of FIG. 2.

Figure 5:
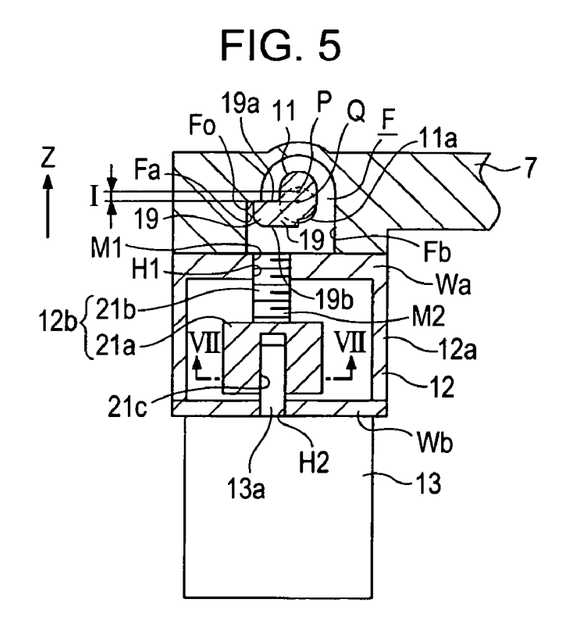
FIG. 5 is a sectional view for illustrating the same energy absorption device.
Figure 6:
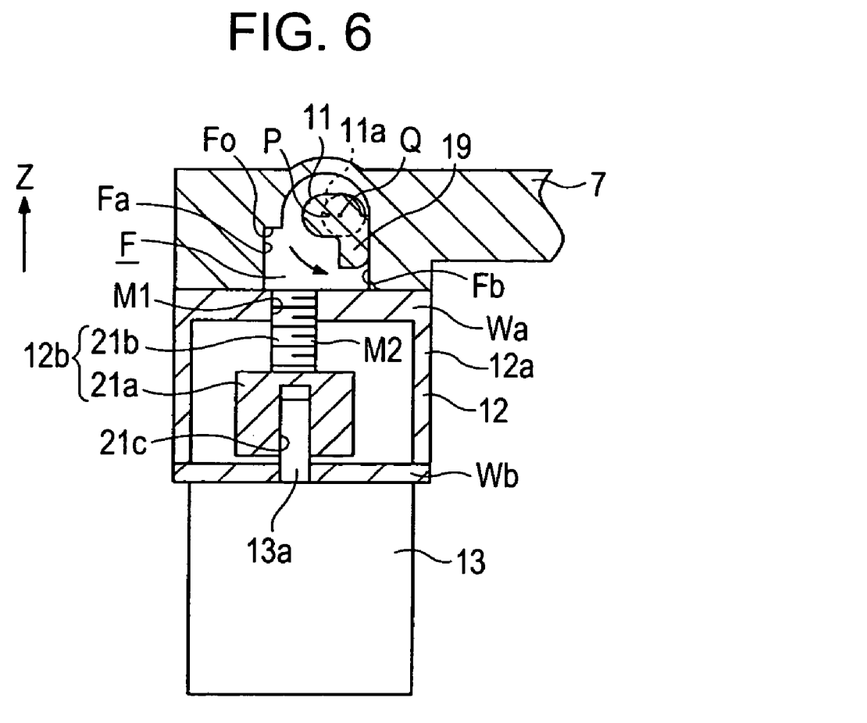
FIG. 6 is a sectional view for illustrating the same energy absorption device.

As shown in FIG. 5, the second crank 11b is provided with a retainer 19 arranged to protrude. Hence, the retainer 19 is rotated along with the rotation of the second crank 11b. When the retainer 19 rotates, a second retaining surface 19b of the retainer 19, as shown in FIG. 6, is brought into engagement with a right side wall Fb of the second support member 7 defining the space F. Also, a left side wall Fa of the second support member 7 defining the space F, as shown in FIG. 5, is provided with a step surface Fo engaged with a first retaining surface 19a of the retainer 19. Accordingly, the second crank 11b is rotated within the range of the rotation of the retainer 19 between the position shown in FIG. 5 and the position shown in FIG. 6.

That is, when the second crank 11b is clockwise rotated about the axis P by 90° in FIG. 6, the retainer 19 abuts the step surface Fo as shown in FIG. 5. As a result, the further clockwise rotation of the support pin 11 is restricted. Also, when the support pin 11 is counterclockwise rotated about the axis P by 90° from the state of FIG. 5, the retainer 19 abuts the right side wall Fb as shown in FIG. 6. As a result, the further counterclockwise rotation of the support pin 11 is restricted.

The retainer 19 is formed so that the axis Q of the first crank 11a is positioned below the axis P of the second crank 11b (in counter arrow Z direction in FIG. 5) when the support pin 11 is abutting the step surface Fo as shown in FIG. 5. Accordingly, when the support pin 11 is rotated about the axis P from the state of FIG. 5 to the state of FIG. 6, the axis Q of the first crank 11a is displaced at the same level as that of the axis P along with the rotation of the support pin 11. That is, the first crank 11a is movable along with the rotation of the second crank 11b from the position below the axis P by the distance I to the position at the same level as that of the axis P.

As shown in FIG. 5, on the bottom surface of the column housing 2a (in counter arrow Z direction in FIG. 5), the restricting means 12 is fixed. On the bottom surface (lower barrier wall Wb) of the restricting means 12, the motor 13 is fixed. The restricting means 12 includes a case 12a and a slider 12b accommodated in the case 12a.

First and second holes H1 and H2 are formed on the upper barrier wall Wa and the lower barrier wall Wb of the case 12a at positions corresponding to the retainer 19, respectively. In the first hole H1, a female screw M1 is formed, and into the second hole H2, a motor shaft 13a of the motor 13 is inserted.

The slider 12b includes a head 21a and a male screw 21b arranged to upward protrude from the head 21a (in arrow Z direction in FIG. 5) and to be mated with the female screw M1. The head 21a is provided with a rectangular recess 21c formed on the central bottom.

Figure 7:
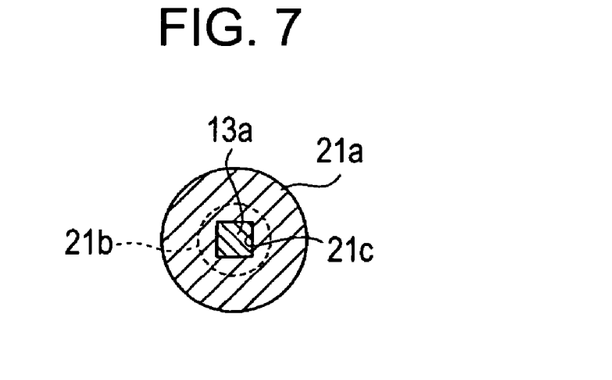
FIG. 7 is a sectional view at the line C-C of FIG. 5.

As shown in FIG. 7, the head 21a is columnar shaped, and its recess 21c is square in section. Into the recess 21c, an engagement portion with a substantially square section formed at an end of the motor shaft 13a, which is inserted through the second hole H2, of the motor 13 is inserted. The head 21a is thereby rotated in normal and reverse directions in synchronous with the normal and reverse rotations of the motor shaft 13a. The slider 12b is fitted to the recess 21c movably relative to the motor shaft 13a in arrow Z direction in FIG. 5. Thus, when the motor shaft 13a is rotated in normal and reverse directions, the slider 12b (the male screw 21b) moves between positions shown in FIGS. 4 and 5 due to the mating of the male screw 21b with the female screw M1.

According to the embodiment, when the motor shaft 13a is rotated in the normal direction, the male screw 21b moves in arrow Z direction from the position shown in FIG. 5 so as to enter the space F and to be able to abut the second retaining surface 19b of the retainer 19. As shown in FIG. 4, the male screw 21b abuts the second retaining surface 19b of the retainer 19 in a state that the retainer 19 is abutting the step surface Fo. Thereby, the support pin 11 (the second crank 11b) cannot rotate counterclockwise. Accordingly, in this state, the first crank 11a is fixed at a position below the second crank 11b by the distance I (in counter arrow Z direction in FIG. 4).

When the motor shaft 13a is rotated in the reverse direction from the position shown in FIG. 4, the slider 12b moves in counter arrow Z direction in FIG. 4 so that the male screw 21b is retracted from the space F so as to separate from the retainer 19 in a non-engagement state (see FIG. 5). The support pin 11 (the second crank 11b) can be thereby rotated counterclockwise.

In such a manner, the restricting means 12 restricts the support pin 11 to be whether rotatable or not along with the rotation of the motor shaft 13a.

The motor 13 is electrically connected to the controller 10 (see FIG. 1) via wiring (not shown). Then, the motor 13 controls the motor shaft 13a to rotate in whether a normal or reverse direction corresponding to the control signal SG outputted from the controller 10. According to the embodiment, when the H-level control signal SG is entered, the motor 13 rotates the motor shaft 13a in the normal direction while when the L-level control signal SG is entered, rotating the motor shaft 13a in the reverse direction. The motor 13 also controls the slider 12b whether to ascend or to descend.

In such a way, since the motor 13 only controls the motor shaft 13a to rotate in normal and reverse directions and rotates the slider 12b, the motor 13 may have a small output torque so as to be reduced in size.

As shown in FIGS. 2 and 3, to the claw T of the spring holder 14, one end of the spring 15 is connected while the other end is connected to the spring pin 16 arranged frontward the vehicle body further than the spring holder 14. The spring 15 normally urges the claw T toward the front of the vehicle body, i.e., so that the support pin 11 (the second crank 11b) rotates clockwise in FIG. 5. Accordingly, the first crank 11a is held and located at a position lower than the second crank 11b.

Figure 8:
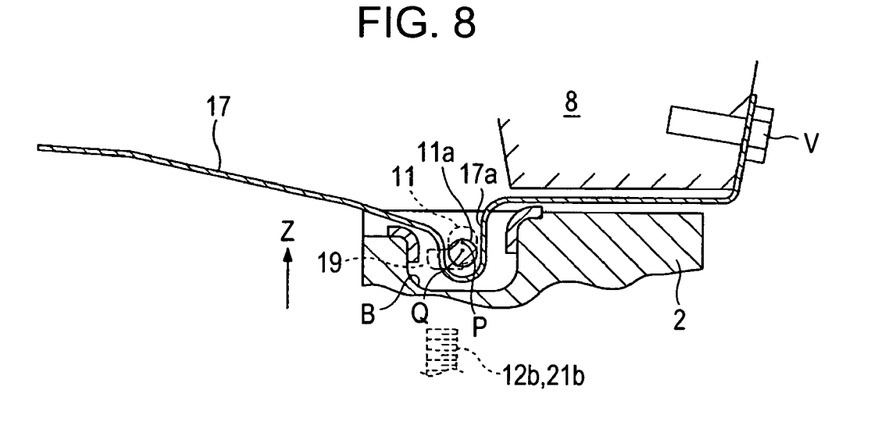
FIG. 8 is an explanatory view for illustrating the operation of the steering apparatus according to the first embodiment.
Figure 9:
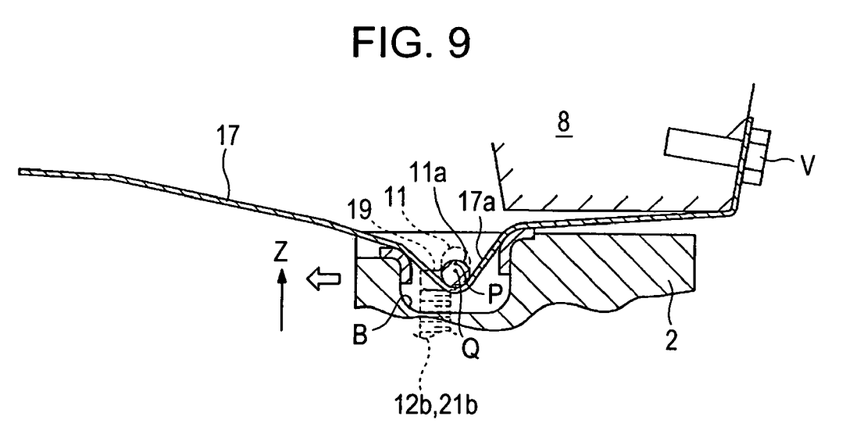
FIG. 9 is an explanatory view for illustrating the operation of the same steering apparatus.

The band-shaped energy absorption plate 17 is arranged along the recess B formed on the column housing 2a. The intermediate portion of the energy absorption plate 17 located in the recess B, as shown in FIG. 8, conceals itself under the first crank 11a so as to form a U-shaped flexural portion 17a clamping the first crank 11a therebetween. One end of the energy absorption plate 17 (adjacent to the steering wheel SW) is fixed to the vehicle body 8 with a bolt V, and the other end is opened so as to extend toward the first support member 6.

Next, the operation of the steering apparatus 1 configured as described above will be described with reference to FIGS. 8 to 11.

FIG. 8 is a drawing illustrating the relationship between the energy absorption plate 17 and the energy absorption plate 17 (the first crank 11a) in a state before the driver H is seated on a driver's seat S. At this time, the motor 13 is not operated, and the male screw 21b is located at a separated position where not engaged with the retainer 19.

In this state, the second crank 11b is urged by the spring 15 so that the support pin 11 (the first crank 11a) is held at the position shown in FIG. 5. Accordingly, the axis Q of the first crank 11a is located at a position lower than the axis P of the second crank 11b.

When the driver H is seated on the driver's seat S, the sensor R detects the weight of the driver H. If the weight is determined 80 kg or more, the controller 10 produces the H-level control signal SG, so that the motor 13 rotates the motor shaft 13a in the normal direction, and the male screw 21b ascends so as to abut the retainer 19. Accordingly, the first crank 11a is fixed at a downward pushed position.

Then, in this state, when the steering column device 2 is separated from the vehicle body 8 so as to break away frontward the vehicle body by a collision, etc., the first crank 11a moves relatively to the energy absorption plate 17 while squeezing the energy absorption plate 17. At this time, since the first crank 11a is downward pushed as mentioned above, the energy absorption plate 17 is strongly squeezed while being deeply bent in the vertical direction (in counter arrow Z direction in FIG. 9). Hence, the squeezing load to the energy absorption plate 17 by the support pin 11 (the first crank 11a) is increased.

As a result, in the case where the weight of the driver H is 80 kg or more, the load applied to the steering column device 2 when the steering column device 2 breaks away is comparatively large; however, the steering apparatus 1 can sufficiently absorb this large impact energy.

Figure 10:
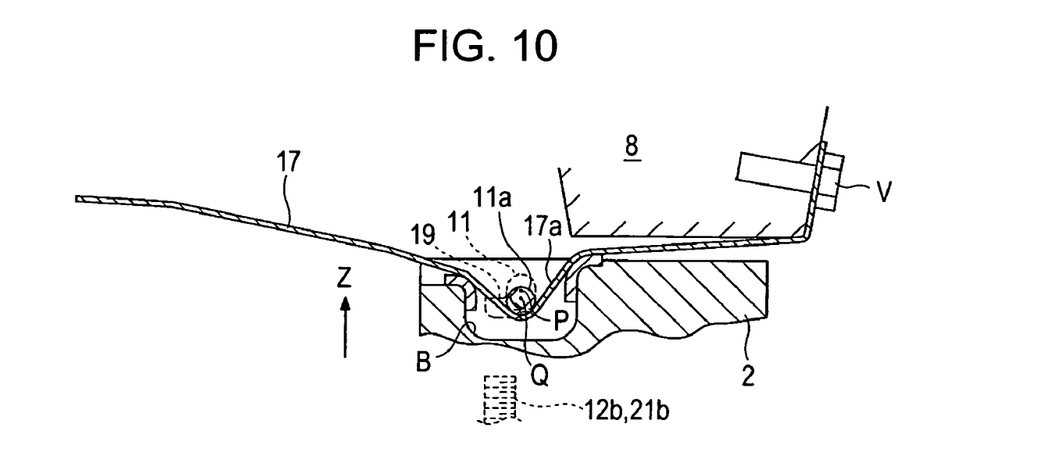
FIG. 10 is an explanatory view for illustrating the operation of the same steering apparatus.

When the controller 10 determines the weight of the driver H less than 80 kg, the controller 10 produces the L-level control signal SG. Then, the male screw 21b is maintained in a downward located state as shown in FIG. 10.

Figure 11:
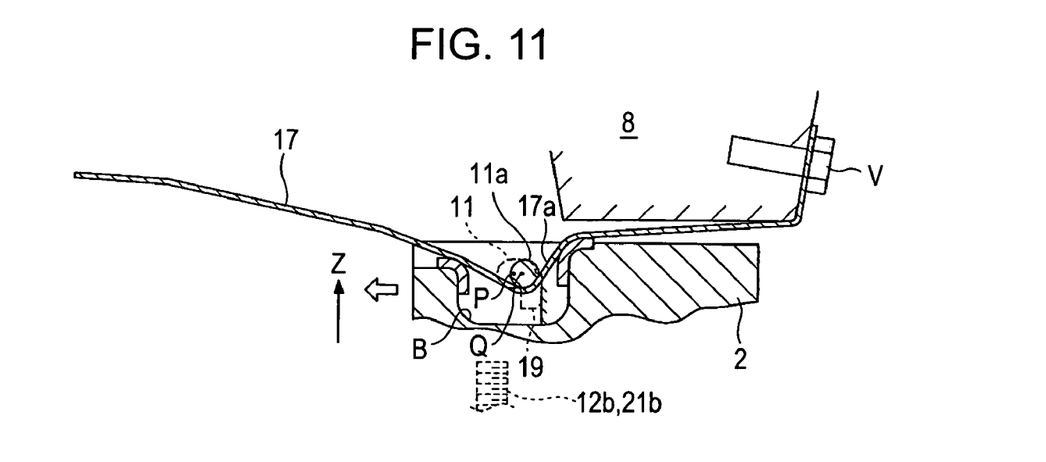
FIG. 11 is an explanatory view for illustrating the operation of the same steering apparatus.

In this state, if the steering column device 2 is separated from the vehicle body 8 so as to break away frontward by a collision, etc., the first crank 11a starts moving relatively to the energy absorption plate 17 while squeezing the energy absorption plate 17 in the same way. At this time, the first crank 11a is rotated by the energy absorption plate 17 from the position shown in FIG. 10 to the position shown in FIG. 11. As a result, as shown in FIG. 11, the first crank 11a is upward moved (in arrow Z direction in FIG. 11) so as to fixedly have the same height as that of the second crank 11b.

Thereby, the first crank 11a squeezes the energy absorption plate 17 while shallowly bending it. As a result, the load for squeezing the energy absorption plate 17 by the support pin 11 is reduced. Accordingly, in the case where the weight of the driver H is less than 80 kg, the load applied to the steering column device 2 when the steering column device 2 breaks away is comparatively small; however, the steering apparatus 1 can absorb this impact energy.

Next, advantages of the embodiment configured as described above will be described below.

(1) According to the embodiment, the support pin 11 (the second crank 11b) for controlling the squeezing load of the energy absorption plate 17 corresponding to the rotation is provided with the retainer 19. There is also provided the slider 12b moving up and down corresponding to the drive of the motor 13 so as to be able to abut the retainer 19 or not.

Accordingly, the motor 13 can restrict the rotation of the support pin 11 by only controlling the slider 12b to ascend or descend, so that the torque of the motor 13 can be reduced, also reducing the motor 13 in size. Since the motor 13 may be inexpensive one because of the small torque, the cost of the steering apparatus capable of controlling the squeezing load corresponding to the weight of the driver H can be suppressed.

(2) According to the embodiment, the energy absorption device 9 is composed of the support pin 11, the restricting means 12, the motor 13, the spring holder 14, the spring 15, the spring pin 16, and the energy absorption plate 17. Accordingly, the structure of the energy absorption device 9 is comparatively simple, so that the steering apparatus 1 itself can also be simply configured.

(3) According to the embodiment, the driver's seat S is provided with the sensor R for detecting the weight of the driver H. On the basis of the detection signal DG from the sensor R, the controller 10 determines whether the weight of the driver H is 80 kg or more or less than 80 kg. When the weight is 80 kg or more, the control signal SG for raising the slider 12b is fed to the motor 13. When the weight is less than 80 kg, the control signal SG for lowering the slider 12b is fed to the motor 13.

Hence, in the case where the weight of the driver H is 80 kg or more, the load squeezing the energy absorption plate 17 by the support pin 11 can be increased. In the case where the weight of the driver H is less than 80 kg, the load squeezing the energy absorption plate 17 by the support pin 11 can be reduced.

(4) According to the embodiment, the steering apparatus 1 is provided with the tilt mechanism C1 and the telescopic mechanism C2. Even when the steering apparatus 1 is provided with the tilt mechanism C1 and the telescopic mechanism C2, the motor 13 for controlling the load squeezing the energy absorption plate 17 can be reduced in size.

Second Embodiment

Next, a second embodiment of the present invention will be described by centering the difference between first and second embodiments thereon with reference to FIGS. 12 to 20. According to the second embodiment, the configuration of the energy absorption device 9 is changed differently from the first embodiment, and the other structures are the same as those of the first embodiment. In addition, the embodiment will be described by using like reference characters to designate like elements common to the first embodiment.

Figure 12:
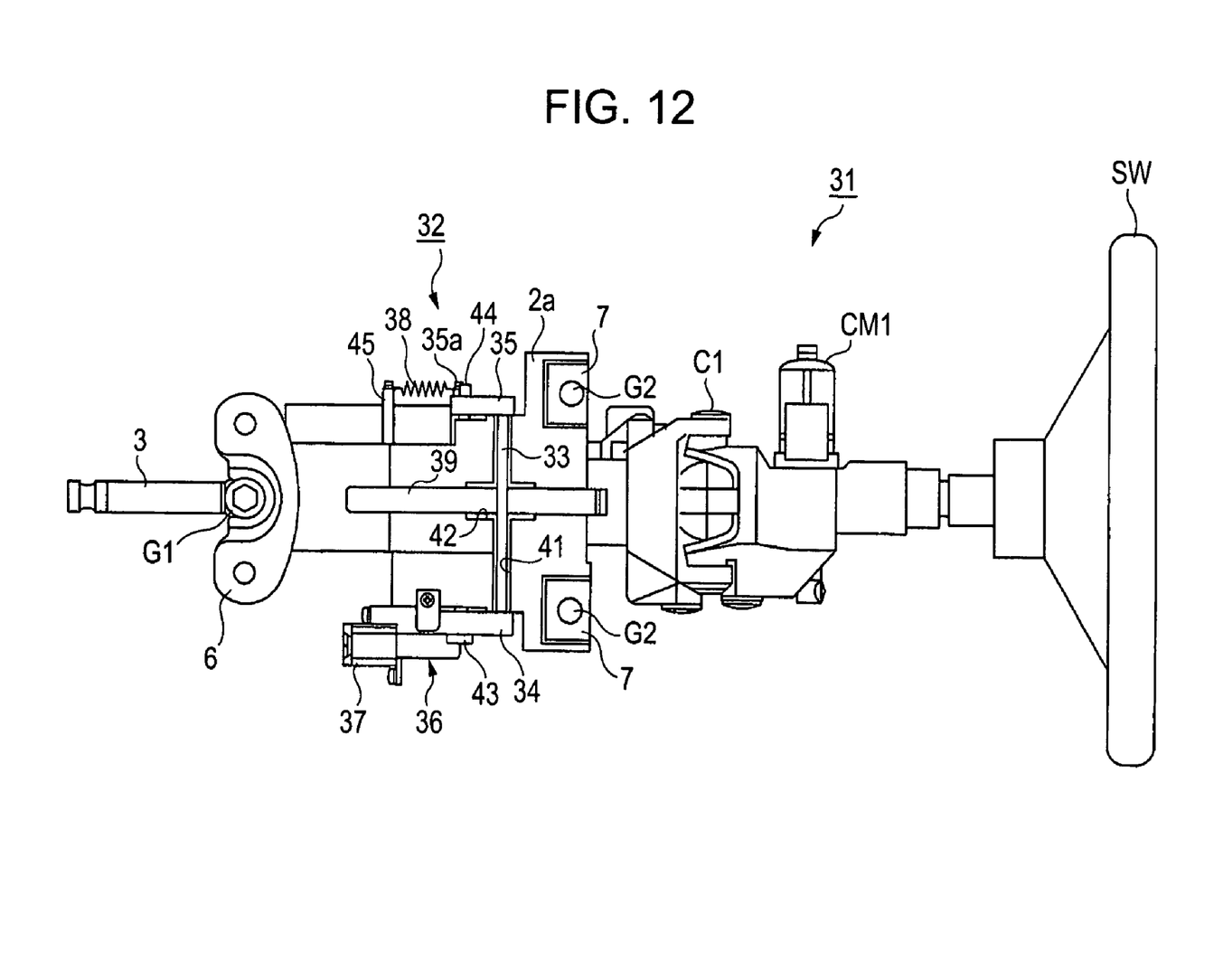
FIG. 12 is a plan view of a shock-absorption steering apparatus according to a second embodiment of the present invention.
Figure 13:
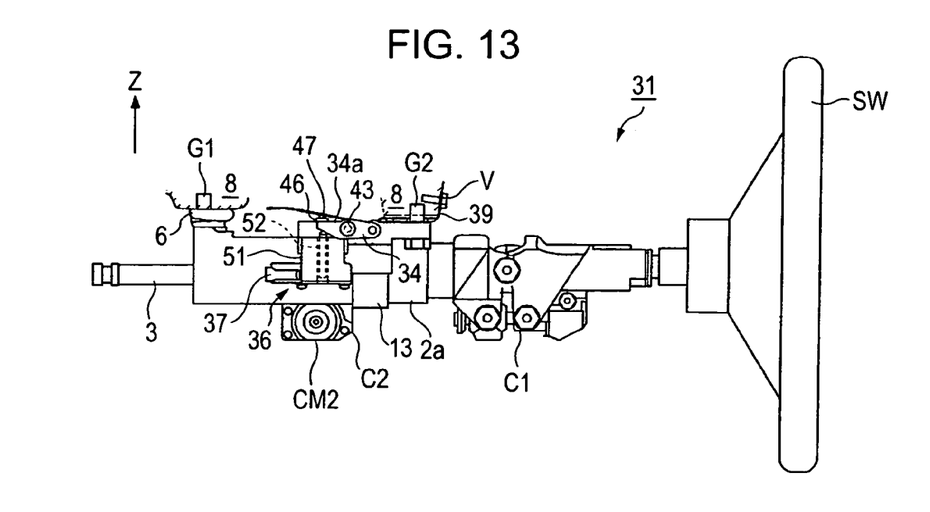
FIG. 13 is a side view of the same steering apparatus.
Figure 14:
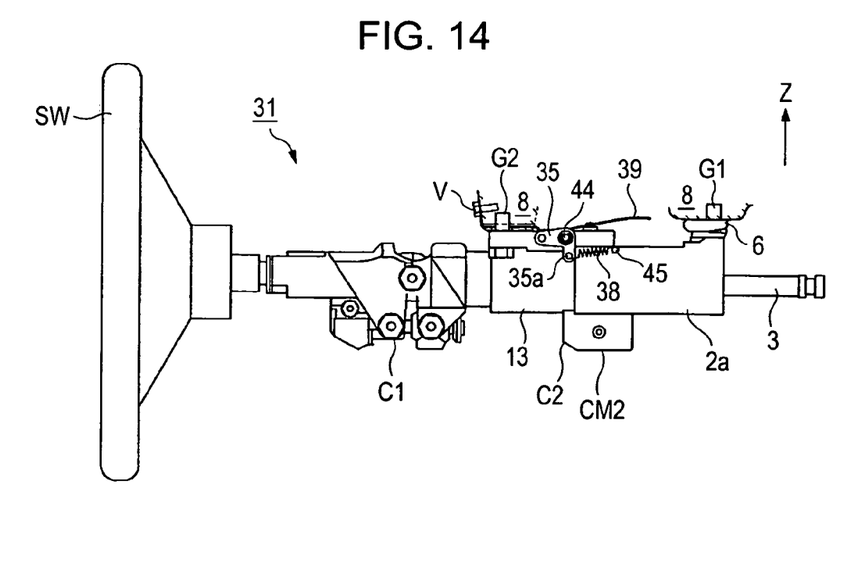
FIG. 14 is a plan view of the same steering apparatus.

FIG. 12 is a plan view of a shock-absorption steering apparatus (referred to as a steering apparatus below) 31; and FIGS. 13 and 14 are side views of the steering apparatus below 31, wherein FIG. 13 is a side view of the steering apparatus below 31 viewed from the left side of the vehicle body, and FIG. 14 is a side view of the steering apparatus below 31 viewed from the right side of the vehicle body.

As shown in FIG. 12, an energy absorption device 32 according to the embodiment includes an energy absorption pin 33, a link 34, a crank 35, restricting means 36, a motor 37, a spring 38, and an energy absorption plate 39.

On the upper surface of the column housing 2a, a groove 41 is formed so as to extend in both directions perpendicular to the steering shaft 3. The energy absorption pin 33 is arranged within the groove 41. Also, in a substantially central portion of the groove 41 in the longitudinal direction, a recess 42 is formed to communicate with the groove 41. The recess 42 has a depth deeper than that of the groove 41 and also has a width in the axial direction of the steering shaft 3 larger than that of the groove 41 (see FIG. 5). The energy absorption plate 39 is arranged along the recess 42.

The energy absorption plate 39 is structured in the same way as that of the first embodiment. That is, the intermediate portion of the energy absorption plate 39 conceals itself under the energy absorption pin 33 so as to form a U-shaped flexural portion 39a clamping the energy absorption pin 33 therebetween (see FIG. 15). One end of the energy absorption plate 39 extending toward the steering wheel SW is fixed to the vehicle body 8 with the bolt V, and the other end is opened so as to extend toward the first support member 6 (see FIG. 13).

At one end of the energy absorption pin 33 (on the left side of the vehicle body), the link 34 is attached. The link 34 is supported by the column housing 2a rotatably about a shaft 43 arranged so as to protrude in a direction perpendicular to the steering shaft 3. At the other end of the energy absorption pin 33 (on the right side of the vehicle body), the crank 35 is attached. The crank 35 is supported by the column housing 2a rotatably about a shaft 44 arranged coaxially with the shaft 43. Hence, the link 34 and the crank 35 are connected together with the energy absorption pin 33, so that both the components are integrally rotated. Thereby, the position at which the energy absorption pin 33 squeezes the energy absorption plate 39 (the height squeezing the energy absorption plate 39) is changed. That is, the energy absorption pin 33 is supported with the link 34 and the crank 35 so that the position squeezing the energy absorption plate 39 is changed corresponding to the rotations of the link 34 and the crank 35. According to the embodiment, the support pin is composed of the energy absorption pin 33 and the crank 35.

As shown in FIG. 14, adjacent to the crank 35, the spring 38 is looped and stretched with one end hooked to a pin 35a protruded from the crank 35 and the other end hooked to a pin 45 protruded from the column housing 2a at a frontward the vehicle body position further than the crank 35. Accordingly, the crank 35 is urged so as to counterclockwise rotate about the shaft 44 in the drawing. That is, the spring 38 urges the link 34 so as to be clockwise rotated about the shaft 43 in FIG. 13.

As shown in FIG. 13, adjacent to the link 34, a rotation restriction plate 46 is fixed on the upper surface of the column housing 2a with a screw 47 for restricting the rotation of the link 34 by retaining a first retaining surface 34a of the link 34. Accordingly, when the first retaining surface 34a of the link 34 abuts the bottom surface of the rotation restriction plate 46, the further clockwise rotation of the link 34 is restricted. As mentioned above, the link 34 is urged by the spring 38 arranged adjacent to the crank 35 so as to clockwise rotate. Thus, the link 34 is maintained by the urging force at a position that the first retaining surface 34a normally abuts the bottom surface of the rotation restriction plate 46.

Also as shown in FIG. 13, adjacent to the link 34, the restricting means 36 is provided. The restricting means 36 includes a case 51 and a slider 52 supported in the case 51 movably in up and down directions (in arrow Z direction and counter arrow Z direction in FIG. 13).

On the side face of the case 51 (frontward the vehicle body), the motor 37 is fixed.

Then, the configuration of the restricting means 36 will be described in detail with reference to FIGS. 15 to 17.

Figure 15:
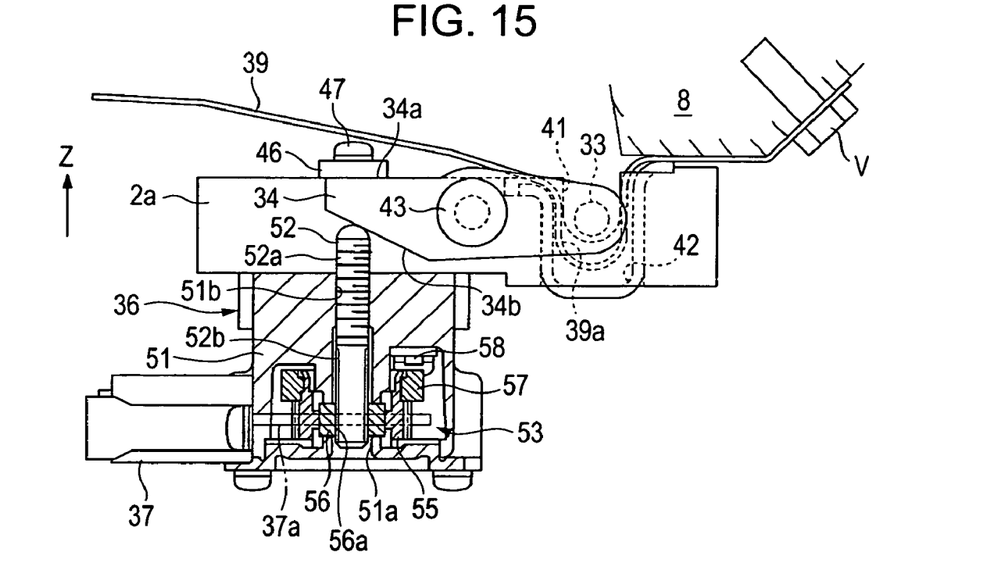
FIG. 15 is a sectional view for illustrating an energy absorption device according to the second embodiment.
Figure 16:
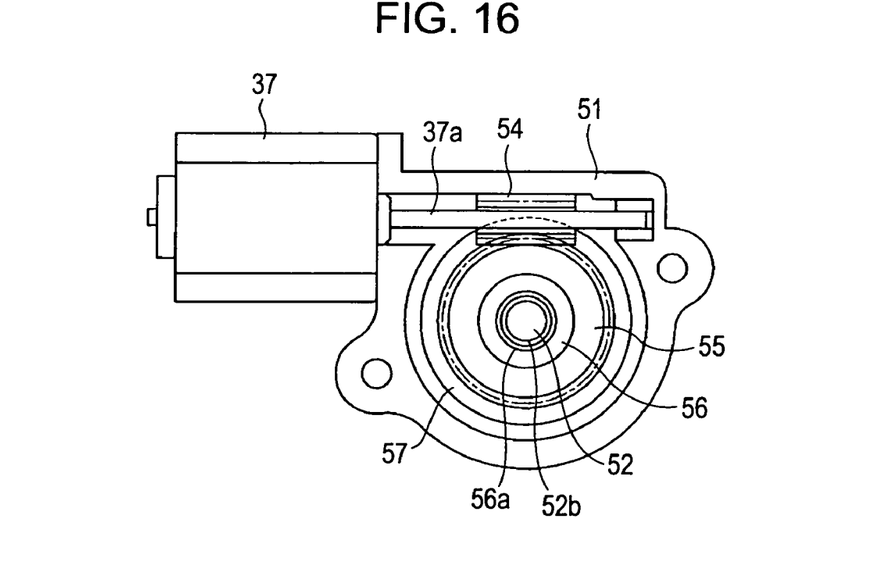
FIG. 16 is a bottom view for illustrating the same energy absorption device.

As shown in FIG. 15, on the upper half portion of the slider 52 in the axial direction, a male screw 52a is formed. On the lower half portion of the slider 52 in the axial direction, a male serration 52b is formed. Within the case 51, a through hole 51a is formed to vertically pass through. The slider 52 is arranged by screwing the male screw 52a with a female screw 51b formed on the upper internal surface of the through hole 51a.

Within the case 51, a reducer 53 is accommodated for reducing the rotation of the motor 37 so as to be transmitted to the slider 52. The reducer 53 includes a worm shaft 54 (see FIG. 16) integrally rotating with an output shaft 37a of the motor 37, a worm wheel 55 mated with the worm shaft 54, and an annular collar 56 fixed to the internal surface of the worm wheel 55 and integrally rotating with the worm wheel 55. On the internal surface of the collar 56, a female serration 56a is formed for fitting to the male serration 52b formed on the slider 52 so as to support the slider 52 movably in vertical directions.

Thus, upon rotating the motor 37, the rotation is transmitted to the worm wheel 55, the collar 56, and the slider 52 serration fitted to the collar 56 via the output shaft 37a of the motor 37 and the worm shaft 54. As a result, the slider 52 moves in vertical directions while rotating within the through hole 51a based on the normal and reverse rotations of the motor 37 because the male screw 52a is mated with the female screw 51b within the through hole 51a. According to the embodiment, the slider 52 moves up and down between the position shown in FIG. 15 (upper limit position) and the position shown in FIG. 17 (lower limit position) based on the normal and reverse rotations of the motor 37.

As shown in FIG. 15, within the case 51, a magnet 57 fixed to the worm wheel 55 for rotating integrally with the worm wheel 55 and a Hall integrated circuit (IC) 58 arranged adjacent to the magnet 57 for detecting the rotation of the magnet 57 are accommodated. The Hall IC 58 detects the number of rotations of the magnet 57 by capturing the variation in the magnetic field due to changes in the rotational position of the magnet 57. Thereby, the Hall IC 58 detects the movement position of the slider 52. According to the embodiment, the magnet 57 and the Hall IC 58 constitute position detecting means. The position detecting means is not obviously limited to this configuration so that other known position detection mechanisms may be adopted.

In addition, the motor 37 is electrically connected to the controller 10 (see FIG. 1) via wiring (not shown) in the same way as in the first embodiment. Then, the motor 37 controls the output shaft 37a to rotate in the normal and reverse directions corresponding to the control signal SG fed from the controller 10. According to the embodiment, when the H-level control signal SG is outputted, the motor 37 rotates the output shaft 37a in the normal direction so as to raise the slider 52. On the contrary, when the L-level control signal SG is outputted, the motor 37 rotates the output shaft 37a in the reverse direction so as to lower the slider 52.

Figure 17:
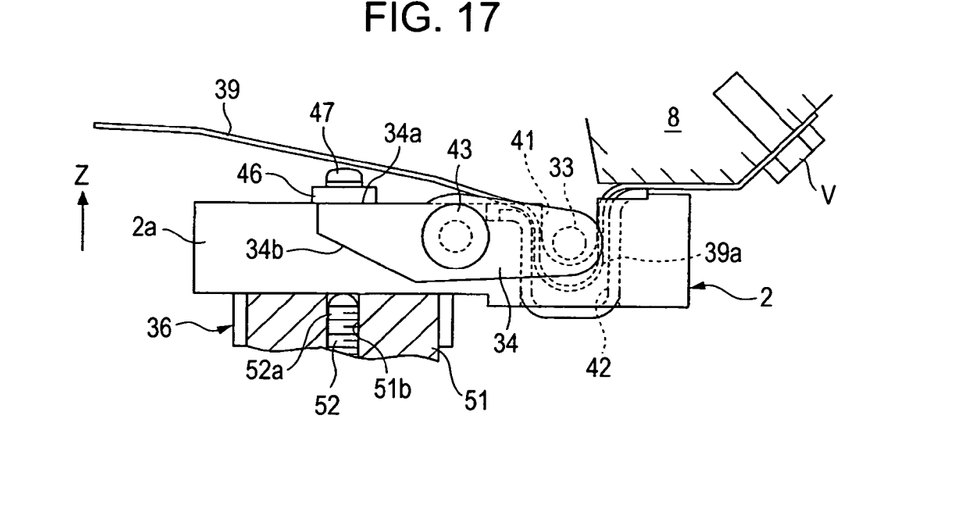
FIG. 17 is a partial sectional view for illustrating the same energy absorption device.

That is, when the output shaft 37a is rotated in the normal direction from the lower limit position shown in FIG. 17, the slider 52 moves upward (in arrow Z direction) from the upper surface of the case 51. Then, as shown in FIG. 15, when the slider 52 ascends up to the position abutting a second retaining surface 34b of the link 34, the counterclockwise rotation of the link 34 is restricted. That is, at this time, the rotational position of the link 34 is fixed by the rotation restriction plate 46 and the slider 52 so that the position of the energy absorption pin 33 is fixed. The male serration 52b formed on the slider 52 is established to have a length longer than the displacement of the slider 52 between the lower limit position shown in FIG. 17 and the upper limit position shown in FIG. 15. Accordingly, the slider 52 cannot be separated from the female serration 56a formed on the collar 56 following the ascending of the slider 52 at this time.

Also, when the output shaft 37a is rotated in the reverse direction from the upper limit position shown in FIG. 15, the slider 52 is separated from the second retaining surface 34b of the link 34 so as to move downward (in counter arrow Z direction). Thereby, the counterclockwise rotation of the link 34 is possible.

In such a manner, the restricting means 36 can rotate or cannot rotate the link 34 by raising or lowering the slider 52 corresponding to the rotation of the motor 37, respectively. Hence, even in the restricting means 36 according to the embodiment, the output torque is small because the motor 37 only needs the rotation of the output shaft 37a in normal and reverse directions and the rotation of the slider 52, reducing the motor 37 in size.

Next, the operation of the steering apparatus 31 configured as described above will be described.

First, the initial state before the driver H is seated on the driver's seat S will be described.

In the initial state, as shown in FIG. 17, the slider 52 is located at a position separated from the second retaining surface 34b of the link 34. At this time, an urging force of the spring 38 arranged adjacent to the crank 35 is applied to the link 34, so that the link 34 is held at a position where the second retaining surface 34b abuts the bottom surface of the rotation restriction plate 46.

Then, a case where from the initial state, the energy absorption amount is established in low level for the weight of the driver H as the driving condition, i.e., the operation when the squeezing load of the energy absorption plate 39 is established in low level will be described.

As a result that the weight of the driver H seated on the driver's seat S is detected by the sensor R, when the weight is less than 80 kg, the controller 10 produces the L-level control signal SG. Then, the slider 52 is maintained at the lower limit position shown in FIG. 17.

Figure 18:
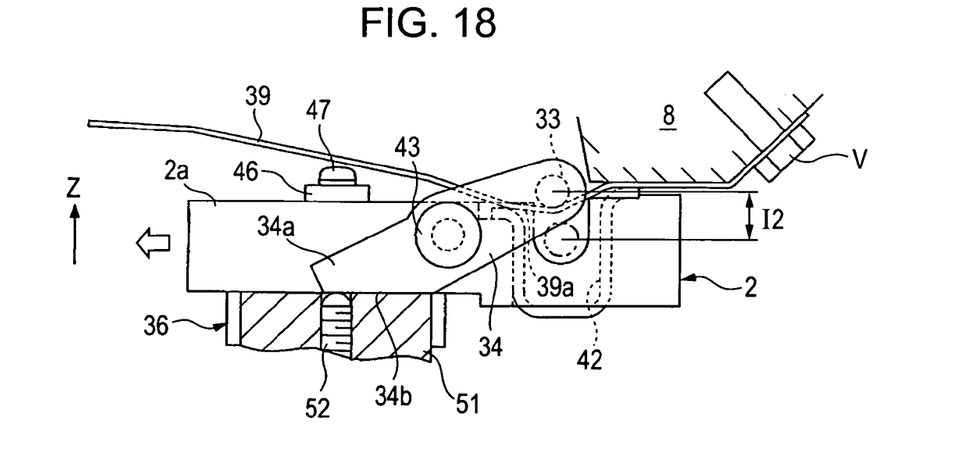
FIG. 18 is a partial sectional view for illustrating the operation of the steering apparatus according to the second embodiment.
Figure 19:
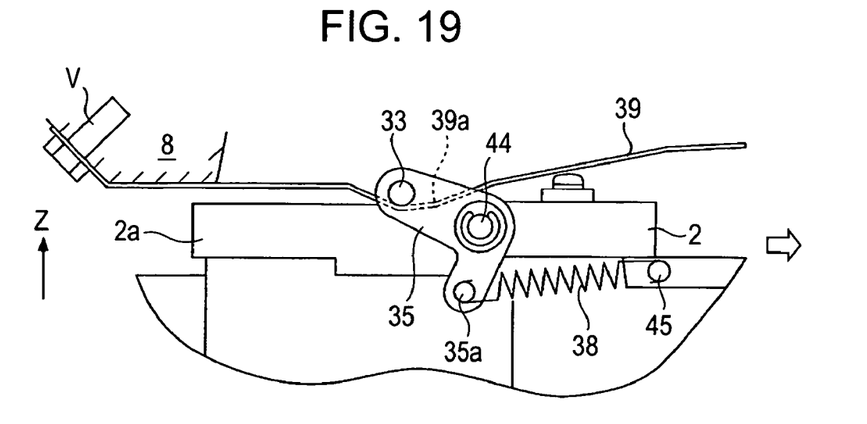
FIG. 19 is a partial sectional view for illustrating the operation of the same steering apparatus.

From this state, as shown in FIG. 18, when the steering column device 2 is separated from the vehicle body 8 so as to break away frontward the vehicle body (in left arrow direction in the drawing) by a collision, the energy absorption pin 33 starts moving relatively to the energy absorption plate 39 while squeezing the energy absorption plate 39. Then, the force counterclockwise rotating the link 34 is applied to the link 34 due to the force squeezing the energy absorption plate 39. Specifically, as shown in FIG. 19, a force clockwise rotating the crank 35 against the urging force of the spring 38 is applied. As a result, the link 34 is rotated from the position shown in FIG. 17 to the position shown in 18, i.e., the position where the second retaining surface 34b abuts the slider 52. Accordingly, the energy absorption pin 33 is maintained at a position raised (in arrow Z direction) by a distance I2 from the position shown in FIG. 17.

Thereby, the energy absorption pin 33 squeezes the energy absorption plate 39 while shallowly bending the energy absorption plate 39. Therefore, the squeezing load (energy absorption amount) of the energy absorption plate 39 at this time is small. Hence, when the weight of the driver H is less than 80 kg, the load applied to the steering column device 2 when the steering column device 2 breaks away is comparatively small, so that the steering apparatus 31 can preferably absorb the impact energy.

Next, a case where from the initial state, the energy absorption amount is established in high level for the weight of the driver H as the driving condition, i.e., the operation when the squeezing load of the energy absorption plate 39 is established in high level will be described.

As a result that the weight of the driver H seated on the driver's seat S is detected by the sensor R, when the weight is 80 kg or more, the controller 10 produces the H-level control signal SG. Then, the motor 37 rotates the output shaft 37a in the normal direction so as to raise the slider 52 from the lower limit position shown in FIG. 17 to the upper limit position shown in FIG. 15. Thereby, the rotational position of the link 34 is fixed by the slider 52 and the rotation restriction plate 46.

Figure 20:
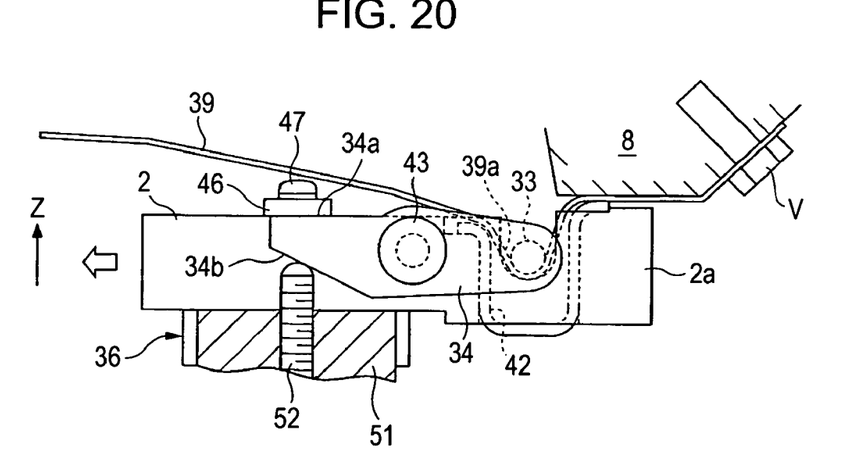
FIG. 20 is a partial sectional view for illustrating the operation of the same steering apparatus.

From this state, as shown in FIG. 20, when the steering column device 2 is separated from the vehicle body 8 so as to break away frontward the vehicle body (in left arrow direction in the drawing) by a collision, the energy absorption pin 33 starts moving relatively to the energy absorption plate 39 while squeezing the energy absorption plate 39. Then, the force counterclockwise rotating the link 34 is applied to the link 34 due to the force squeezing the energy absorption plate 39 in the same way as mentioned above. However, the position of the slider 52 at this time is maintained due to the self-trapping of the reducer 53. Accordingly, the height in the horizontal direction of the energy absorption pin 33 is maintained at the upper limit position shown in FIG. 15 (the position where the second retaining surface 34b abuts the slider 52).

Thereby, the energy absorption pin 33 strongly squeezes the energy absorption plate 39 while deeply bending it downward in the vertical direction (in counter arrow Z direction in FIG. 20). Therefore, the squeezing load (energy absorption amount) of the energy absorption plate 39 at this time becomes large. Accordingly, in the case where the weight of the driver H is 80 kg or more, the load applied to the steering column device 2 when the steering column device 2 breaks away is comparatively large; however, the steering apparatus 1 can preferably absorb this large impact energy.

According to the embodiment, by the position detecting means (the magnet 57 and the Hall IC 58) provided in the restricting means 36, the movement position of the slider 52 can be detected. Thus, based on the detection result by the position detecting means, the movement position of the slider 52 is established at a position between the upper limit position shown in FIG. 15 and the lower limit position shown in FIG. 17, so that when the height of the energy absorption pin 33 is thereby varied within the range of the distance I2 (see FIG. 18), the squeezing load of the energy absorption plate 39 may also be established at an arbitrary load between the high-level load and the low-level load.

As described above, the second embodiment has following advantages.

(1) The link 34 and the crank 35 are connected together with the energy absorption pin 33 so as to adjust the squeezing load of the energy absorption plate 39 by changing the height in the horizontal direction based on the rotations of the link 34 and the crank 35. In such a structure, in comparison with that of the first embodiment (the height of the axis Q of the first crank 11a squeezing the energy absorption plate 17 is deviated by the rotation of the support pin 11), the maximum displacement of the squeezing load (the variable range of the squeezing load) can be increased. That is, according to the first embodiment, in order to increase the maximum displacement, the diameter of the support pin 11 may be increased for example; whereas according to the second embodiment, the maximum displacement can be increased without increasing the diameter of the support pin 11.

(2) By moving the slider 52 to the upper limit position so as to abut the second retaining surface 34b of the link 34 and restricting the rotation of the link 34 with the rotation restriction plate 46 and the slider 52, the squeezing load to the energy absorption plate 39 can be established at a high-level.

(3) By moving the slider 52 to the lower limit position so as to separate from the second retaining surface 34b of the link 34 and to free the link 34, the squeezing load to the energy absorption plate 39 can be established at a low-level.

(4) The position detecting means (the magnet 57 and the Hall IC 58) is provided for detecting the movement position of the slider 52. Thereby, when the movement position of the slider 52 is established at between the upper limit position and the lower limit position based on the result detected by the position detecting means, the squeezing load to the energy absorption plate 39 can be established at an arbitrary load between the high-level load and the low-level load.

(5) By only rotating the slider 52 by the motor 37 so as to control the slider 52 to ascend or descend, the rotation of the link 34 can be restricted. The torque of the motor 37, therefore, can be reduced, resulting in a small-sized and inexpensive motor.

(6) The energy absorption device 32 includes the energy absorption pin 33, the link 34, the crank 35, the restricting means 36, the motor 37, the spring 38, and the energy absorption plate 39. Hence, the structure of the energy absorption device 32 may be comparatively simple in the same way as in the first embodiment.

The present invention is not limited to the embodiments described above, so that modifications may be made as follows.

According to the first embodiment, corresponding to the weight of the driver H, the position of the support pin 11 (the first crank 11a) is controlled; according to the second embodiment, corresponding to the weight of the driver H, the position of the energy absorption pin 33 (the link 34 and the crank 35) is controlled; however, the driving condition is not limited only to such a weight of the driver H. For example, under other driving conditions such as the presence of the worn seat belt, a body type or a posture of the driver H determined with a camera equipped in a vehicle cabin, an a colliding speed upon a vehicle collision, positions of the support pin 11 and the energy absorption pin 33 may be controlled.

The steering apparatuses 1 and 31 according to the first and second embodiments, each is provided with the tilt mechanism C1 and the telescopic mechanism C2; alternatively, none or any one of them may be provided.

The steering apparatuses 1 and 31 according to the first and second embodiments, each is provided with only one of the energy absorption plates 17 and 39; alternatively, a plurality of them may be provided.

According to the first embodiment, the position of the first crank 11a can only be fixed to at the same position as that of the second crank 11b or at the position lower by the distance I; however, it may be more flexibly fixed.

According to the first and second embodiments, the reference body weight is 80 kg; however, the present invention is not limited to this, so that it may be more than 80 kg or less than 80 kg.

Technical concepts of the present invention comprehended from the embodiments and modifications described above will be added below.

(A) In the shock-absorption steering apparatus according to the present invention, the support pin may includes an energy absorption pin acting on the energy absorption plate so as to produce a squeezing load and a crank attached to the energy absorption pin and rotatably supported to the steering column, and by changing the height of the energy absorption pin based on rotations of the link and the crank, the squeezing position may be adjusted.

(B) In the shock-absorption steering apparatus according to the present invention, the restricting means may include position detecting means for detecting the movement position of the slider, and by controlling the movement position of the slider so as to change the rotation amount of the retainer based on the result detected by the position detecting means, the squeezing position may be adjusted.

What is claimed is:

1. A shock-absorption steering apparatus, comprising:
   a steering column;
   a support member for supporting the steering column detachably from a vehicle body; and
   an energy absorption device for supporting the steering column relatively movably frontward of the vehicle body and absorbing impact energy applied to the steering column by restricting the movement of the steering column, the energy absorption device comprising:
   an energy absorption plate adapted to be fixed to the vehicle body;
   a rotatable support pin supported by the steering column to apply a squeezing load to the energy absorption plate, a squeezing position of the support pin on the energy absorption plate varying by rotation of the support pin, and the squeezing load applied to the energy absorption plate, varying according to the squeezing position;
   a retainer fixed to the support pin for rotating with the support pin;
   restricting means for restricting rotation of the retainer; and
   a motor for controlling the restricting means to either permit or prevent rotation of the retainer corresponding to a predetermined condition, wherein the support pin is a crank pin having a first crank and a second crank, and the first crank squeezes the energy absorption plate while the second crank is provided with the retainer, and wherein by rotating the second crank, the squeezing position is varied.

2. The apparatus according to claim 1, wherein the restricting means is a slider that reciprocates so as to be arranged at an engagement position with the retainer or at a non-engagement position therewith corresponding to normal and reverse rotations of the motor.

3. The apparatus according to claim 1, wherein the predetermined condition is a body weight of a driver of the vehicle, and the energy absorption device includes a sensor arranged in a driver's seat equipped in the vehicle body for detecting the body weight of the driver and a control circuit storing a reference weight established in advance so as to compare the reference weight with the weight detected by the sensor for controlling the motor based on the compared result.

4. The apparatus according to claim 1, wherein the steering column includes at least one of a tilt mechanism and a telescopic mechanism.

5. The apparatus according to claim 1, wherein the vehicle body includes detecting means arranged for detecting the driving condition, and the motor is controlled based on the result detected by the detecting means.

6. A vehicle shock-absorption steering apparatus comprising:
- a steering shaft;
- a steering column device for rotatably supporting the steering shaft; and
- an energy absorption device provided in the steering column device for absorbing impact when the steering column device is frontward separated from a vehicle body by the impact, the energy absorption device comprising:
- an energy absorption plate adapted to be fixed to the vehicle body;
- a squeezing member for producing a squeezing load by contacting with the energy absorption plate so as to squeeze the energy absorption plate when the steering column device is frontward separated from the vehicle body by the impact, the squeezing member being displaceable relative to the energy absorption plate between a high-level load position where the squeezing load applied to the energy absorption plate is at a high-level and a low-level load position where the squeezing load applied to the energy absorption plate is lower than the high-level load;
- restricting means for restricting the displacement of the squeezing member from the high level load position to the low level load position;
- a motor for positioning the restricting means; and
- controlling means for controlling the motor corresponding to a predetermined condition.

7. The apparatus according to claim 6, wherein the restricting means includes a slider, having a male screw portion, and a case having a female screw portion mated with the male screw portion, and by the rotation of the motor, the slider is rotated so as to be able to expand and contract relative to the squeezing member.

8. The apparatus according to claim 7, wherein the energy absorption device further comprises a reducing mechanism interposed between the slider and the motor.

9. The apparatus according to claim 8, wherein the reducing mechanism includes a worm shaft rotating integrally with an output shaft of the motor and a worm wheel mated with the worm shaft.

10. The apparatus according to claim 6, further comprising urging means for urging the squeezing member in a direction displacing the squeezing member toward the high-level load position.

11. The apparatus according to claim 6, wherein the squeezing member is a crank member having a first crank and a second crank, and the first crank acts on the energy absorption plate so as to produce a squeezing load, and by rotating the second crank, the squeezing member can be displaced between the high-level load position and the low-level load position.

12. The apparatus according to claim 6, wherein the squeezing member includes an energy absorption pin for producing a squeezing load by touching the energy absorption plate when the steering column device is frontward separated from the vehicle body by impact and a link connected to the energy absorption pin and rotatably attached to the steering column device so as to enable the position of the energy absorption pin relative to the energy absorption plate to be displaced by the rotation.

13. The apparatus according to claim 12, further comprising urging means for urging the squeezing member in a direction displacing the squeezing member toward the high-level load position.

14. The apparatus according to claim 13, wherein the urging means includes a crank rotating coaxially with the link and a spring with one end attached to the crank and the other end attached to the steering column device, and by the urging force of the spring, the squeezing member is urged in a direction displacing the squeezing member toward the high-level load position.

15. The apparatus according to claim 6, wherein the predetermined condition is a body weight of a driver of the vehicle, and the energy absorption device includes a sensor arranged in a driver's seat equipped in the vehicle body for detecting the body weight of the driver, and the controlling means includes a control circuit storing a reference weight established in advance so as to compare the reference weight with the weight detected by the sensor for controlling the motor based on the compared result.

16. The apparatus according to claim 6, wherein the steering column includes at least one of a tilt mechanism and a telescopic mechanism.

* * * * *